United States Patent
Harris et al.

(10) Patent No.: US 6,988,267 B2
(45) Date of Patent: Jan. 17, 2006

(54) METHOD AND DEVICE FOR IMPLEMENTING A DOWNLOADABLE SOFTWARE DELIVERY SYSTEM

(75) Inventors: David Harris, Bozeman, MT (US); Mitchell William Koury, Bozeman, MT (US); William J. Moody, Belgrade, MT (US); Paul W. Bolton, Bozeman, MT (US); Phillip Louis Amicucci, Three Forks, MT (US); Robert Lyle Wall, Bozeman, MT (US); Charles Glen Swenson, Bozeman, MT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/397,621

(22) Filed: Mar. 26, 2003

(65) Prior Publication Data

US 2003/0188306 A1    Oct. 2, 2003

Related U.S. Application Data

(63) Continuation of application No. 09/586,522, filed on Jun. 2, 2000, now abandoned.

(60) Provisional application No. 60/137,352, filed on Jun. 3, 1999.

(51) Int. Cl.
G06F 9/44 (2006.01)
G06F 11/30 (2006.01)
H04L 9/00 (2006.01)
A63F 13/00 (2006.01)

(52) U.S. Cl. .................. 717/173; 717/169; 717/170; 713/171; 713/191; 713/201; 713/150; 463/42; 463/43

(58) Field of Classification Search ............... 717/168, 717/169, 170, 171, 172, 173; 713/171, 191, 713/201, 150; 463/42, 43
See application file for complete search history.

(56) References Cited

U.S. PATENT DOCUMENTS

| 5,136,644 A | | 8/1992 | Audebert et al. ............. 380/25 |
| 5,155,837 A | * | 10/1992 | Liu et al. ..................... 709/221 |
| 5,410,703 A | | 4/1995 | Nilsson et al. .............. 395/700 |

(Continued)

FOREIGN PATENT DOCUMENTS

EP    0 689 325    6/1995

(Continued)

OTHER PUBLICATIONS

H. Higaki, "Extended Group Communication Algorithm for Updating Distributed Programs", 1996, IEEE, p. 386-393.*

(Continued)

Primary Examiner—Tuan Dam
Assistant Examiner—Qamrun Nahar
(74) Attorney, Agent, or Firm—Beyer Weaver & Thomas, LLP.

(57) ABSTRACT

A method and device implementing a downloadable operatively connected to a plurality of gaming machines either by a direct communications link or through the use of one or more site controllers or PCs. Each gaming machine and site controller or PC contains two executable spaces, one of which typically contains the software image currently being implemented by the device. The other executable space is designated to receive from the central system a new software image that will be utilized by the device. The central system transfers a new image to be executed, via packet encrypted communications, to a networked device which stores the image in an executable space, while continuing to run the currently designated image. Upon instruction from the central system, the device switches over to the new image, allowing one or more machines to implement a software upgrade on a continuous basis.

34 Claims, 8 Drawing Sheets

U.S. PATENT DOCUMENTS

| | | | | |
|---|---|---|---|---|
| 5,421,009 | A | | 5/1995 | Platt .......................... 395/600 |
| 5,421,017 | A | | 5/1995 | Scholz et al. ................ 395/700 |
| 5,473,772 | A | * | 12/1995 | Halliwell et al. ........... 717/171 |
| 5,555,418 | A | * | 9/1996 | Nilsson et al. .............. 717/153 |
| 5,643,086 | A | * | 7/1997 | Alcorn et al. ................. 463/40 |
| 5,654,746 | A | | 8/1997 | McMullan, Jr. et al. ........ 348/6 |
| 5,682,533 | A | | 10/1997 | Siljestroemer .............. 395/616 |
| 5,715,462 | A | * | 2/1998 | Iwamoto et al. ............ 717/173 |
| 5,759,102 | A | * | 6/1998 | Pease et al. .................. 463/42 |
| 5,845,077 | A | * | 12/1998 | Fawcett ....................... 717/173 |
| 5,845,090 | A | | 12/1998 | Collins, III et al. .... 395/200.51 |
| 5,848,064 | A | | 12/1998 | Cowan ......................... 370/338 |
| 5,870,723 | A | | 2/1999 | Pare, Jr. et al. ............... 705/39 |
| 5,885,158 | A | | 3/1999 | Torango et al. ............... 463/27 |
| 5,896,566 | A | | 4/1999 | Averbuch et al. ........... 455/419 |
| 5,905,523 | A | | 5/1999 | Woodfield et al. ............ 348/12 |
| 5,970,143 | A | * | 10/1999 | Schneier et al. ............ 713/181 |
| 6,006,034 | A | * | 12/1999 | Heath et al. ................ 717/170 |
| 6,029,046 | A | * | 2/2000 | Khan et al. .................... 725/31 |
| 6,047,128 | A | * | 4/2000 | Zander ........................ 717/173 |
| 6,104,815 | A | | 8/2000 | Alcorn et al. ............... 380/251 |
| 6,154,878 | A | * | 11/2000 | Saboff ......................... 717/173 |
| 6,219,836 | B1 | | 4/2001 | Wells et al. |
| 6,317,827 | B1 | * | 11/2001 | Cooper ........................... 713/2 |
| 6,488,585 | B1 | | 12/2002 | Wells et al. |
| 6,805,634 | B1 | | 10/2004 | Wells et al. |
| 2002/0137217 | A1 | | 9/2002 | Rowe .......................... 436/42 |
| 2003/0064771 | A1 | | 4/2003 | Morrow et al. |
| 2003/0188306 | A1 | | 10/2003 | Harris et al. |

FOREIGN PATENT DOCUMENTS

| | | | |
|---|---|---|---|
| EP | 0 706 275 | | 4/1996 |
| EP | 0706275 | * | 10/1996 |
| EP | 0841 615 | | 5/1998 |
| EP | 0 905 614 | | 3/1999 |
| EP | 1 004 970 | | 5/2000 |
| WO | WO 01/20424 A2 | | 3/2001 |

OTHER PUBLICATIONS

H. Higaki, "Group Communication Algorithm for Dynamically Updating in Distributed Systems", 1994, IEEE, p. 56-62.*

S. Hauptmann and J. Wasel, "On-line Maintenance with On-the-fly Software Replacement", 1996, IEEE, p. 70-80.*

Hiroaki Higaki, 8 page document entitled "Group Communication Algorithm for Dynamically Updating in Distributed Systems" Copyright 1994 IEEE International Conference On Parallel and Distributed Systems (pp. 56-62) 08-8186-655-6/94, higaki@sdesun.slab.ntt.jp.

Steffen Hauptmann, et al., 12 page document entitled "On-line Maintenance With On-The-Fly Software Replacement", Copyright 1996 IEEE Proceedings, Third International Conference On Configurable Distributed Systems, (pp. 70-80) 0-8186-7395-8/96.

Hiroaki Higaki, 9 page document entitled "Extended Group Communication Algorithm For Updating Distributed Programs" Copyright 1996, IEEE, International Conference ON Parallel and Distributed Systems, 0-8186-7267-6/96, , hig@takilab.k.dendai.as.jp.

* cited by examiner

METHOD AND DEVICE FOR IMPLEMENTING A DOWNLOADABLE SOFTWARE DELIVERY SYSTEM

This application is a continuation of U.S. patent application Ser. No. 09/586,522, filed Jun. 2, 2000, now abandoned, which claims benefit of U.S. Provisional Application No. 60/137,352, filed Jun. 3, 1999.

TECHNICAL FIELD

In general, this invention relates to a downloadable software system, and more particularly, to a method and device implementing a downloadable software system for an electronic gaming machine communications network.

BACKGROUND OF THE INVENTION

In general, conventional gaming machine networks typically include a central system operatively connected to one or more individual gaming machines via intermediate communication site controllers. Although the gaming machines communicate with the central system, each gaming machine or site controller contains a central chipset which locally stores the computer code to be is executed by the device to perform gaming related functions. These chipsets typically consist of electronic programmable read only memory (EPROM) which permanently store the computer code. EPROM chipsets are conventionally preferred because the electronic memory can be controlled in a secured manner without giving unauthorized access to the gaming machine code. For example, in the event the computer code needs to be upgraded, service personnel are required to manually change the chipset for each gaming machine and/or site controller.

Because a service technician must perform the same operation for each machine or controller, the current method of upgrading gaming machine/site controller or PC software typically takes a long time to accomplish at a substantial cost, including the cost of the technician time and the cost of a new chipset for each machine.

Accordingly, there is a need for a system which can upgrade computer code within a networked device without requiring a manual change in the device components or requiring a high cost of implementation.

SUMMARY OF THE INVENTION

Generally described, a gaming machine system is provided. The gaming machine system includes a central system and one or more gaming devices having at least one storage component operable to receive an executable software image and in communication with the central system. Additionally, the gaming device receives the software image from the central system.

In another aspect of the present invention, a method in a computer system for implementing a gaming machine system including a central system in communication with one or more gaming devices is provided. In accordance with the method, a software image to be downloaded to the one or more gaming devices is obtained. The software image is downloaded to a selected group of the one or more gaming devices.

In a further aspect of the present invention, a method is a computer system for implementing a download of a software image is provided. In accordance with the method, a central process obtains a software image to be downloaded and transfers the software image to one or more device processes. The one or more device processes receives and stores the software image. At least one of the one or more device processes executes the software image.

In yet another aspect of the present invention, a gaming machine system is provided. The gaming machine system includes a central system and one or more gaming devices having storage means for receiving an executable software image. The one or more gaming devices are in communication with the central system. Additionally, the gaming machine system includes downloading means for transferring the software image from the central system to the one or more gaming devices.

A method and device implementing a downloadable software delivery system for an electronic gaming machine communications network is provided. A central system is operatively connected to a plurality of gaming machines either by a direct communications link or through the use of one or more site controllers. In this regard, it is contemplated that a PC or suitable computing device could be substituted for a site controller and that the downloadable software delivery still be effected. Each gaming machine and site controller or PC contains two executable spaces, one of which typically contains the software image currently being implemented by the device. The other executable space is designated to receive from the central system a new software image that will be utilized by the device. The central system transfers a new image to be executed, via packet encrypted communications, to a networked device which stores the image in an executable space, while continuing to run the currently designated image. Upon instruction from the central system, the device switches over to the new image, allowing one or more machines to implement a software upgrade on a continuous basis.

BRIEF DESCRIPTION OF THE DRAWING

The present invention is described in detail below with reference to the attached figures, wherein.

DETAILED DESCRIPTION OF THE INVENTION

In essence, the present invention enables a central system operatively connected to a plurality of gaming machines and site controllers (or PC's) to upgrade one or more software images via a communications link without requiring a manual change of the device chipset.

Figure 1:
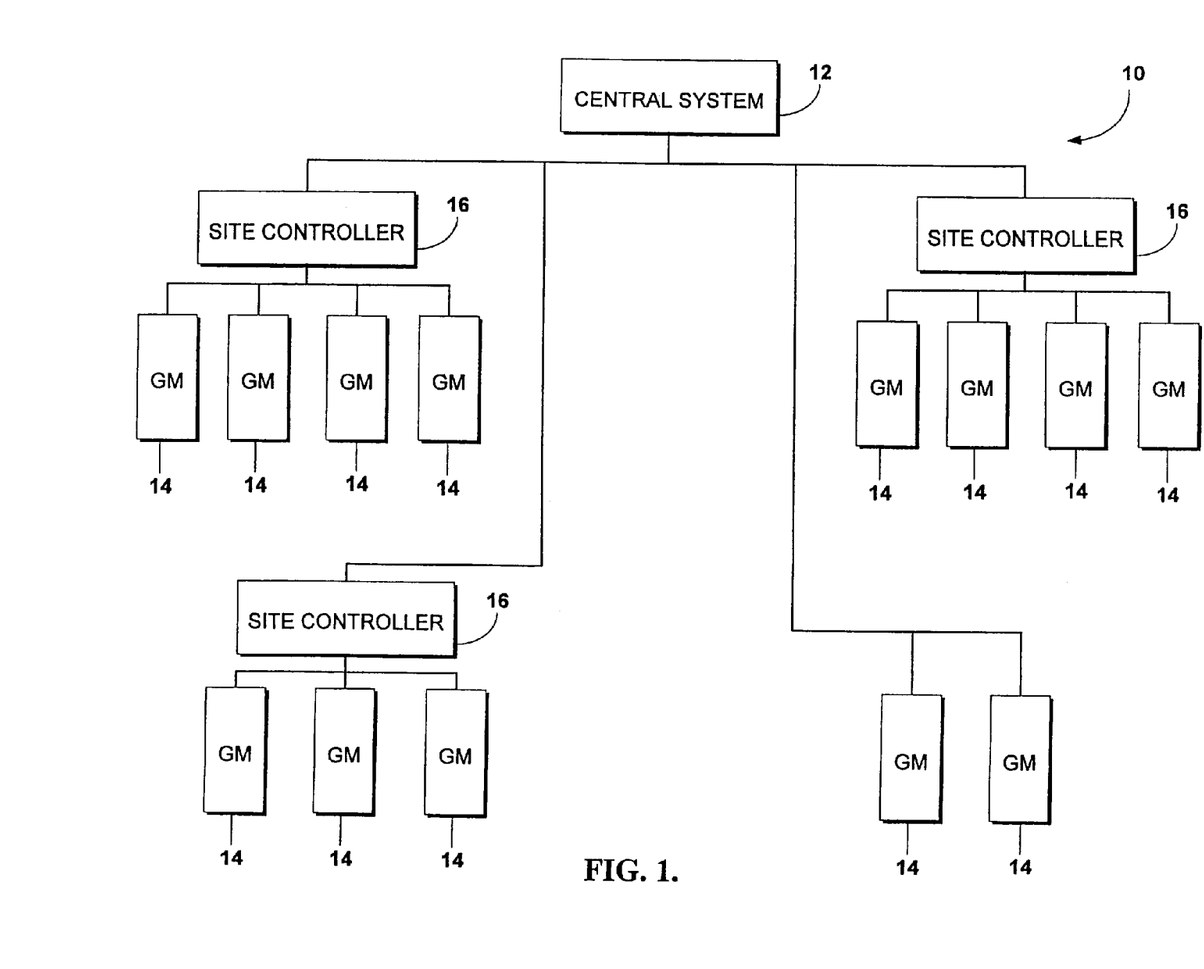
FIG. 1 is a block diagram of a gaming machine network utilized in accordance with the present invention.

FIG. 1 is block diagram illustrative of a gaming machine network operable to be utilized by the present invention, designated generally by the reference numeral 10. Generally, the gaming machine network 10 includes a central system 12 operatively connected to a number of gaming machines 14 either by a direct communication link to each individual machine 14 or indirectly through the one or more site controllers or PC's 16. The connectivity of the central system 12 to the gaming machines 14 can include continuous, on-line communication systems, including local area networks and/or wide area networks, or may be periodic, dial up semi-continuous communications. Because many gaming machine network currently utilize some type of communication network, the present invention preferably utilizes the preestablished communication system between the central system and the gaming machines such as through telephone, cable, radio or satellite links. However, a dedicated software delivery communication network may also be implemented and is considered to be within the scope of the present invention.

Figure 2:
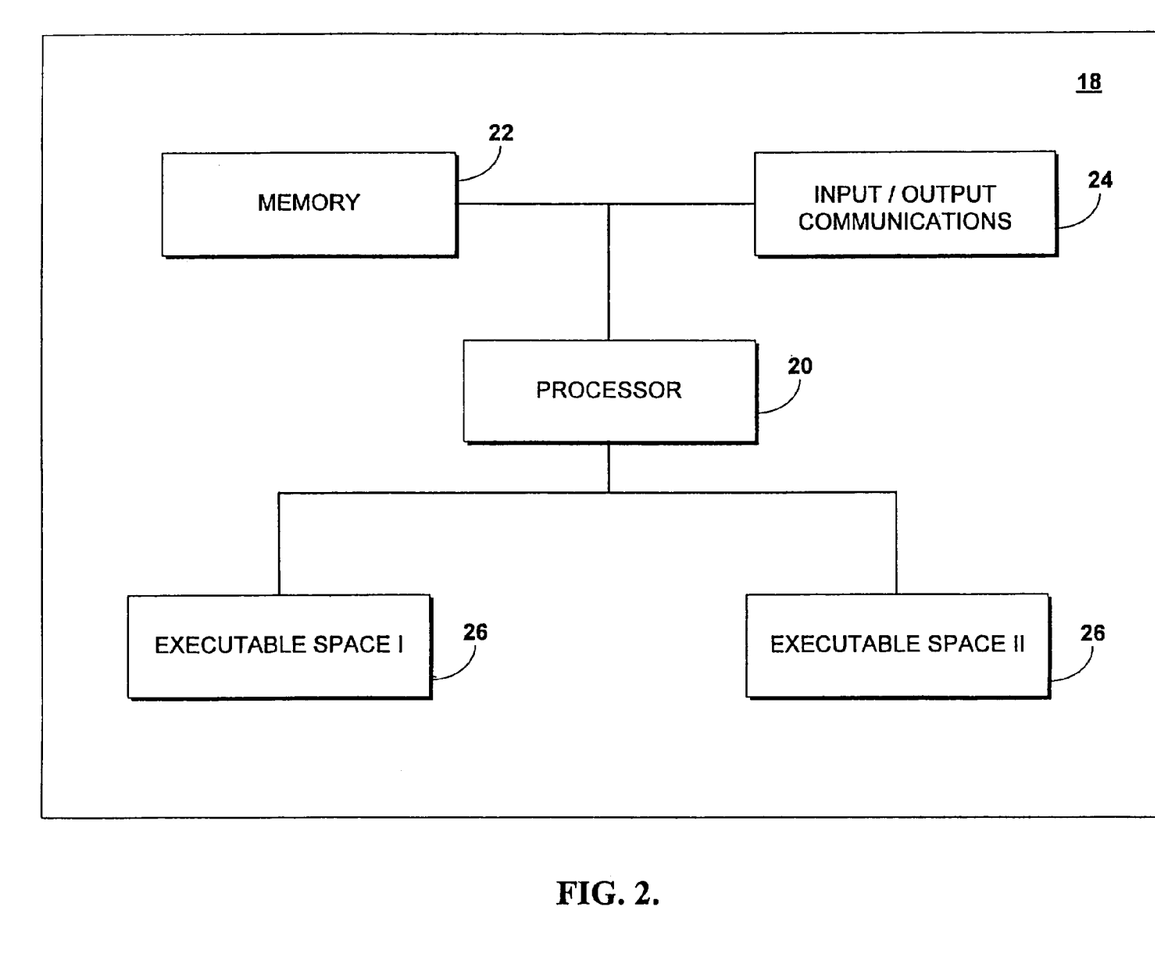
FIG. 2 is a block diagram illustrative of various device components utilized in accordance with the present invention.

FIG. 2 is a block diagram illustrative of some of the components common to the gaming machines 14, site controllers 16 or other networked device (FIG. 1), generally referred to as a device 18, utilized in the present invention. Each device 18 preferably contains a processor 20, a memory 22, a communications input/output 24, such as a modem or network card, and at least two executable spaces 26. As would be readily understood by one skilled in the relevant art, the processor 20, memory 22 and communications input/output 24 includes any variety of component generally utilized in the implementation of the device. Moreover, in one embodiment, one or more of the executable spaces 26 are FLASH ROM. However, as would be readily understood, the executable spaces 26 may include DVD, CD-ROM, battery backed RAM or any other non-volatile memory storage device.

Preferably, one executable space 26 is typically designated to store the software code, or image, currently being executed by the device 18. The other executable space is typically designated to receive a new image transferred by the central system. As would be understood, although the two executable spaces are preferably separate, the same effect is accomplished through the use of a single, larger executable space. In this embodiment, each device uses a portion of the executable space 26 to assist in receiving and storing incoming images from the central system.

As an alternative embodiment, the present invention may also be implemented with one executable space and sufficient other memory, which can include memory 22, to temporarily store a downloaded image. In this embodiment, the image would be downloaded to the temporary memory and then transferred to the more permanent executable space 26.

Generally, the present invention facilitates the implementation and replacement of a software image on a device in a gaming machine network by allowing the transmittal of a new image to a device while the device continues to execute and/or process a previous software image. Additionally, because the present invention may utilize one or more existing communication lines, the transfer of a new image can include various security and error checking features to ensure and preserve the secured character of the executable code.

Figure 3A:
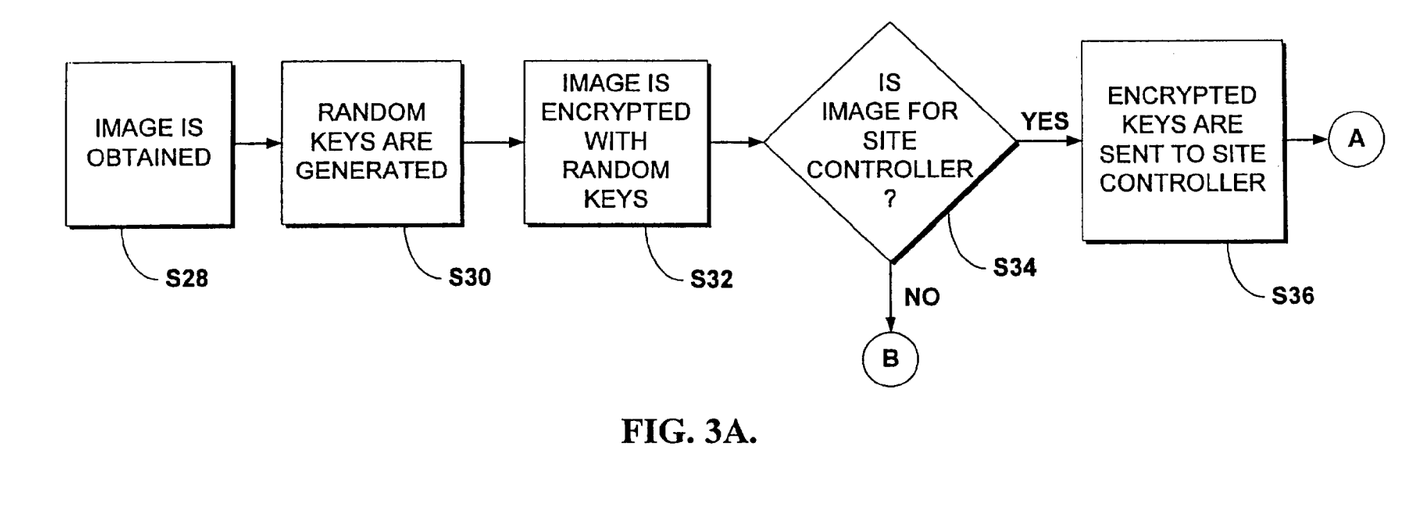
FIGS. 3A, 3B & 3C are flow diagrams illustrative of a software image transfer method utilizing random key encryption in accordance with the present invention.
Figure 3B:
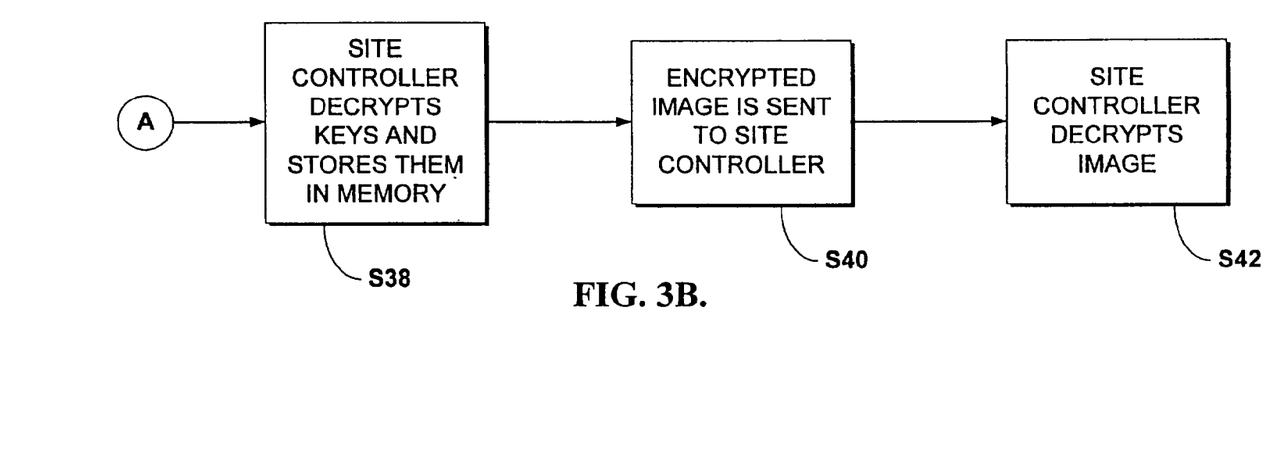
Figure 3C:
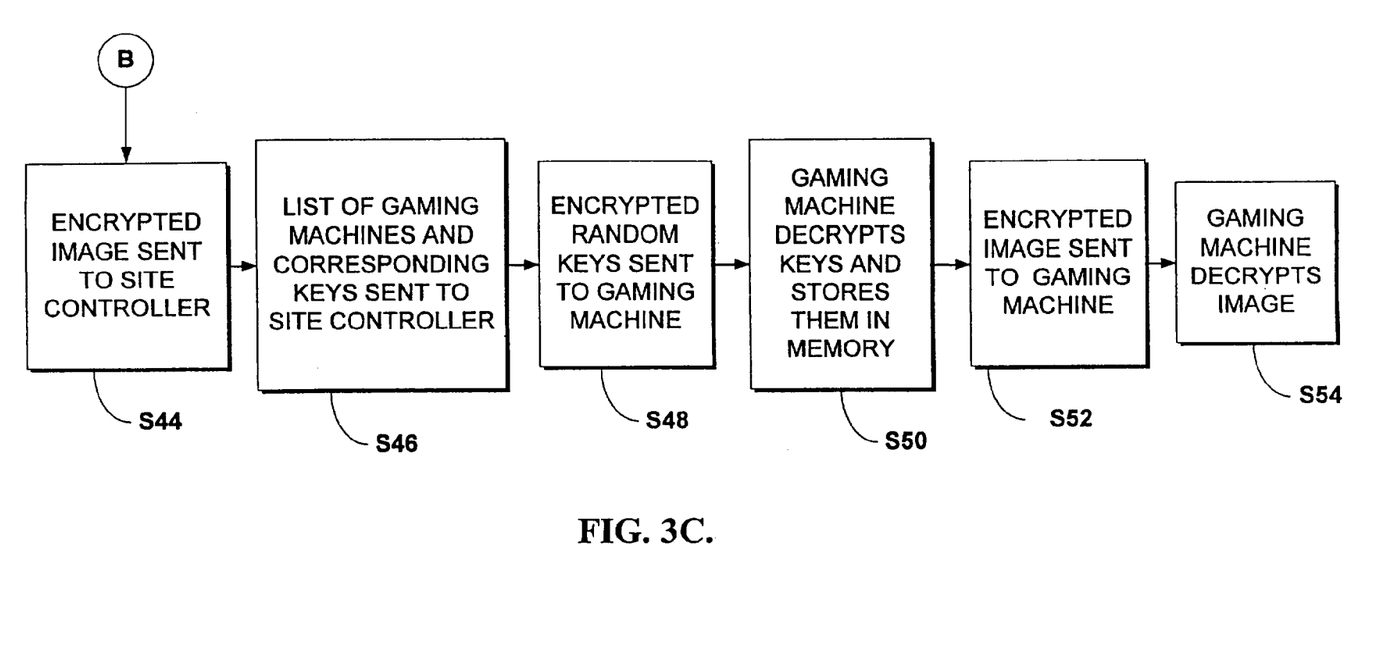

FIGS. 3A, 3B & 3C are flow diagrams of an image downloading process utilizing a random key encryption in accordance with the present invention. With reference to FIG. 3A, at S28, the desired image to be downloaded is created, and loaded into the central system. Preferably, the operating system of the central system provides a user interface, such as a graphical user interface, that allows a user to download the image to the central system's memory. Additionally, the user interface can include prompts for a user to enter additional information needed for the downloading process including download time information, download windows and version numbers. As would be understood, depending on the function of the image being downloaded, the additional information needed to complete the download will vary.

Once the image has been downloaded to the central system, the user selects which devices are to receive the image. The user selection can include all of the devices or subsets of devices. Preferably, the central system includes some form of error checking that ensures that the designated device is compatible with the image to be downloaded. At S30, the central system generates a random encryption key for each device designated to receive the image and encrypts the image with each of the random keys at S32. The random keys and encrypted images are stored in the central system memory. Additionally, the central system stores a completed, unencrypted version of the image in memory to use a signature for verification that the download is complete.

Generally, the function of a site controller (or PC) download differs from the function of the gaming machine download. Accordingly, at S34 a determination of whether the download is for a site controller is made. With reference to FIGS. 3A & 3B, if at S34 the desired image is designated to be downloaded to a site controller or PC, the random keys used to encrypt the image are themselves encrypted with a general encryption key and sent to the site controller at S36. At S38, the site controller or PC decrypts the random keys and stores the keys in a memory, such as memory 22 (FIG. 2). The central system then sends the random key encrypted message to the site controller at S40. Once the download is complete, the central system sends additional instructions to the site controller such as to decrypt the image with the stored random keys or to store the image into its second executable space.

With reference to FIGS. 3A & 3C, if at S34, the desired image is designated to be downloaded to a gaming machine or other device, the central system sends the encrypted message to the site controller (or PC) associated with the particular gaming machine at S44, preferably in a manner as described above in steps S36–S42. At S46, the central system sends the site controller a list of the gaming machines to receive the image and their preassigned general encryption keys, which are encrypted with a key known to the gaming machine. At S48, the site controller transfers the encryption keys to the gaming machine, which decrypts and stores the random keys in memory. The site controller then sends the random key encrypted image to the gaming machine at S50. Once the download is complete, the central system instructs the gaming machine, via the site controller, to prepare and store the image into its second executable space at S54.

Figure 4A:
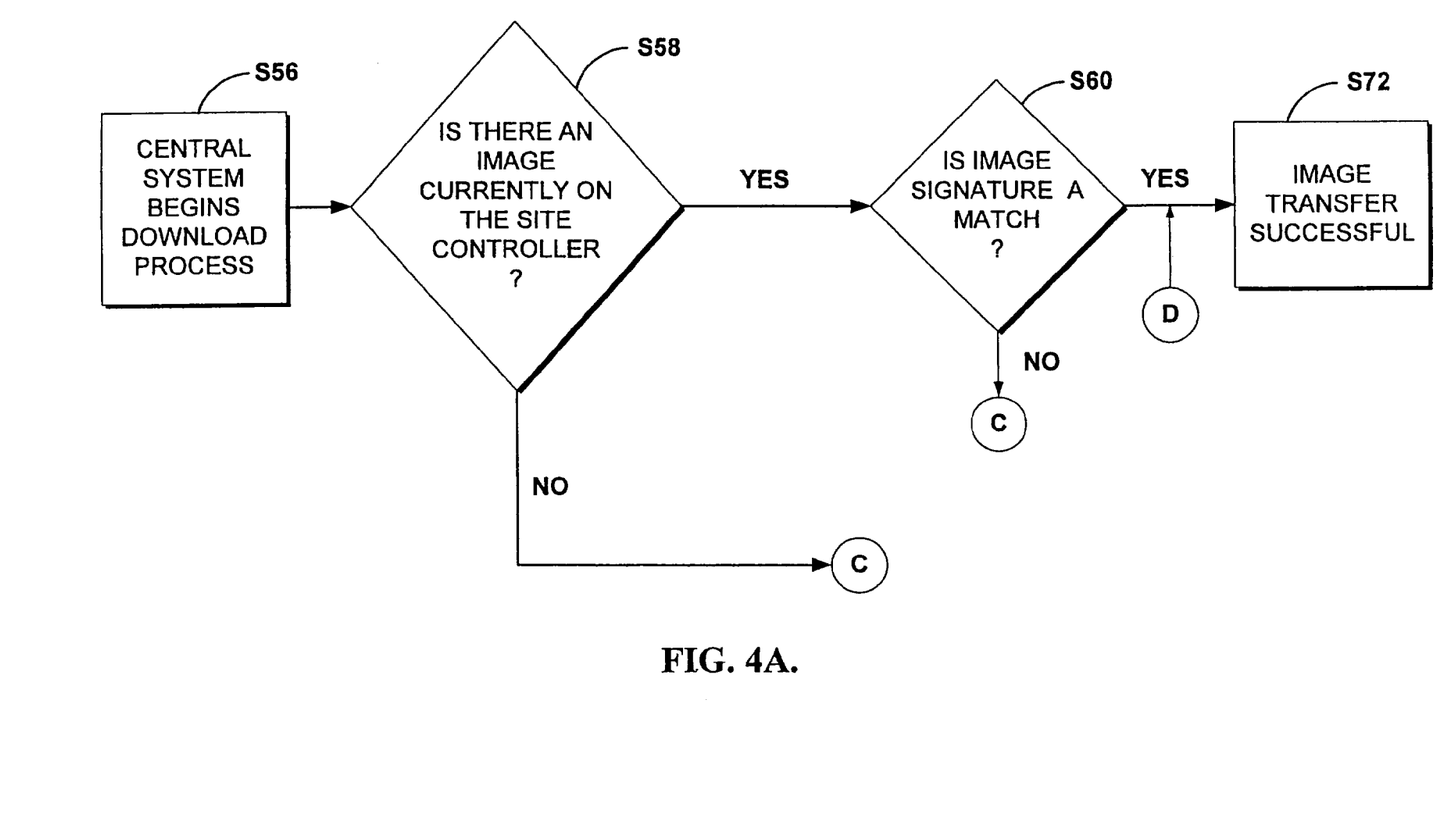
FIGS. 4A & 4B are flow diagrams illustrative of an image transfer error checking and bypass process in accordance with the present invention.
Figure 4B:
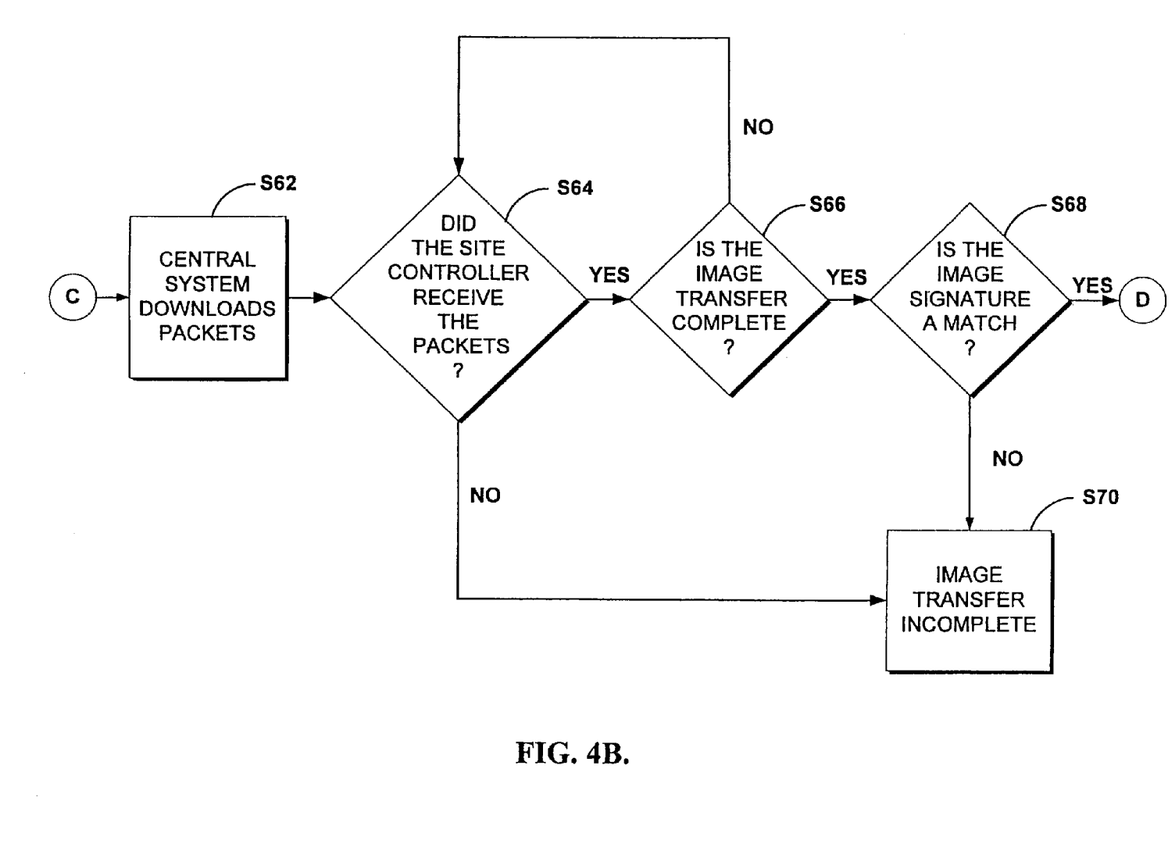

With reference to FIGS. 4A & 4B, the present invention implements a bypass and error checking function between the central system and the site controller or PC. Because the site controller can be associated with a number of gaming machines or other devices, once the site controller stores the image into its executable space, it does not need to reexecute the downloading step for each subsequent transfer to a gaming machine. With reference to FIG. 4A, the central system begins the download process each time an image is to be transferred to a device as illustrated at S56. At S58, the central system checks whether a downloaded image has already been stored in the site controller's executable space.

If so, at S60, the central system verifies that the signature of the image loaded on the site controller is correct and the transfer is complete at S72. With reference to FIGS. 4A & 4B if an image is not present in the site controller's executable space at S58 or if the signature does not match at S60, the central system sends the image via packets to the site controller or PC at S62.

Preferably, the central system relies on package acknowledge signals from the site controller to ensure that each individual packet is received by the site controller. Accordingly, at S64, the central system determines whether all the packets have been received. If one or more package acknowledge signals are not received, the transfer is incomplete at S70. At this point, the central system may resend the individual packets not received or may attempt to resend the entire image. Alternatively, the central system may just declare the transfer a failure.

If the packets are received and acknowledged at S64, the central system completes the transfer at S66. At S68, the central system requests a signature of the image from the site controller to verify a proper transmission and decryption. With reference to FIGS. 4A & 4B, if the signature is a match, the download is a success at S72 and the site controller implements any downloading instruction. If the signature is not a match, the transfer is incomplete at S70.

Figure 5:
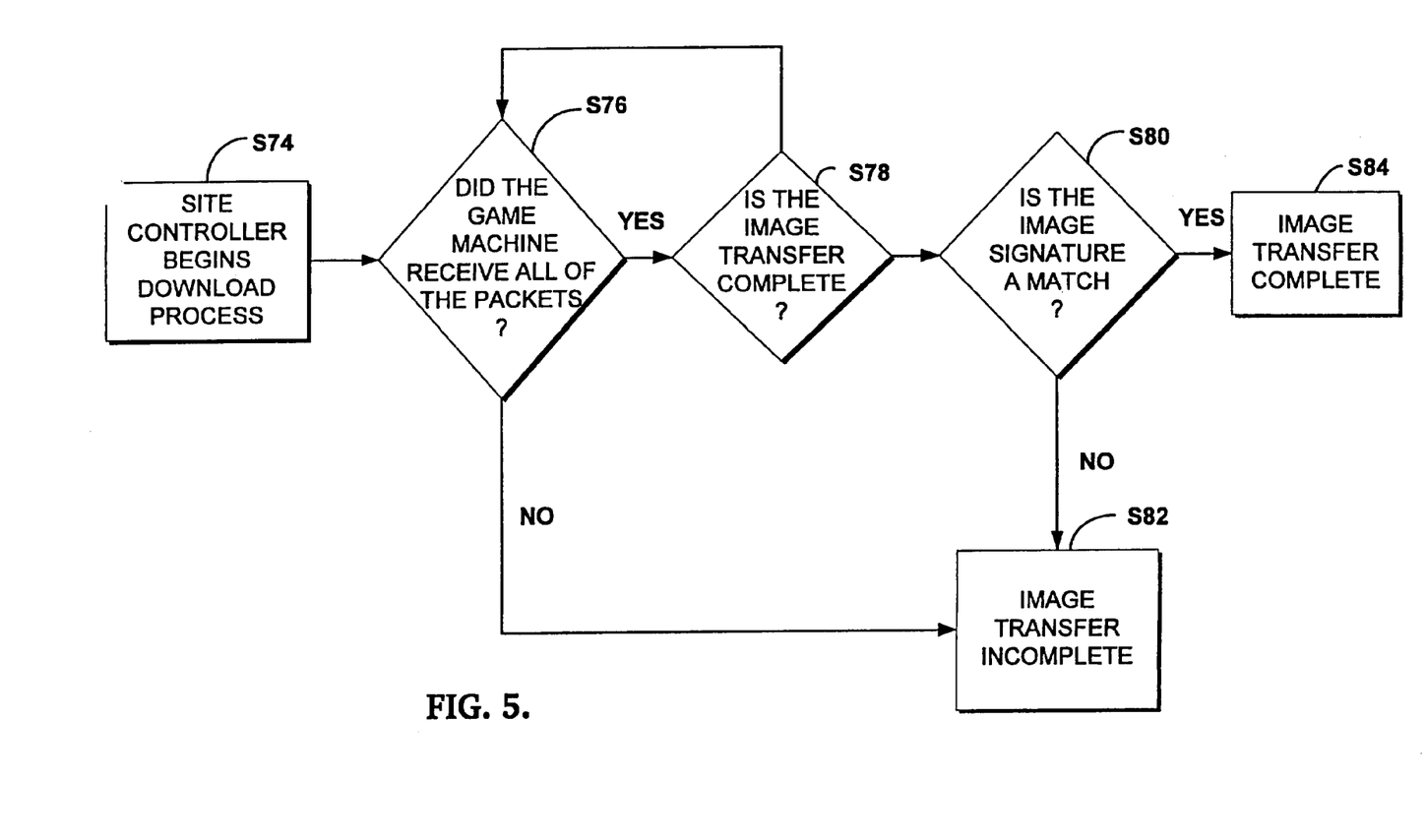
FIG. 5 is a flow diagram illustrative of a software image transfer method to a gaming machine in accordance with the present invention.
Figure 6:
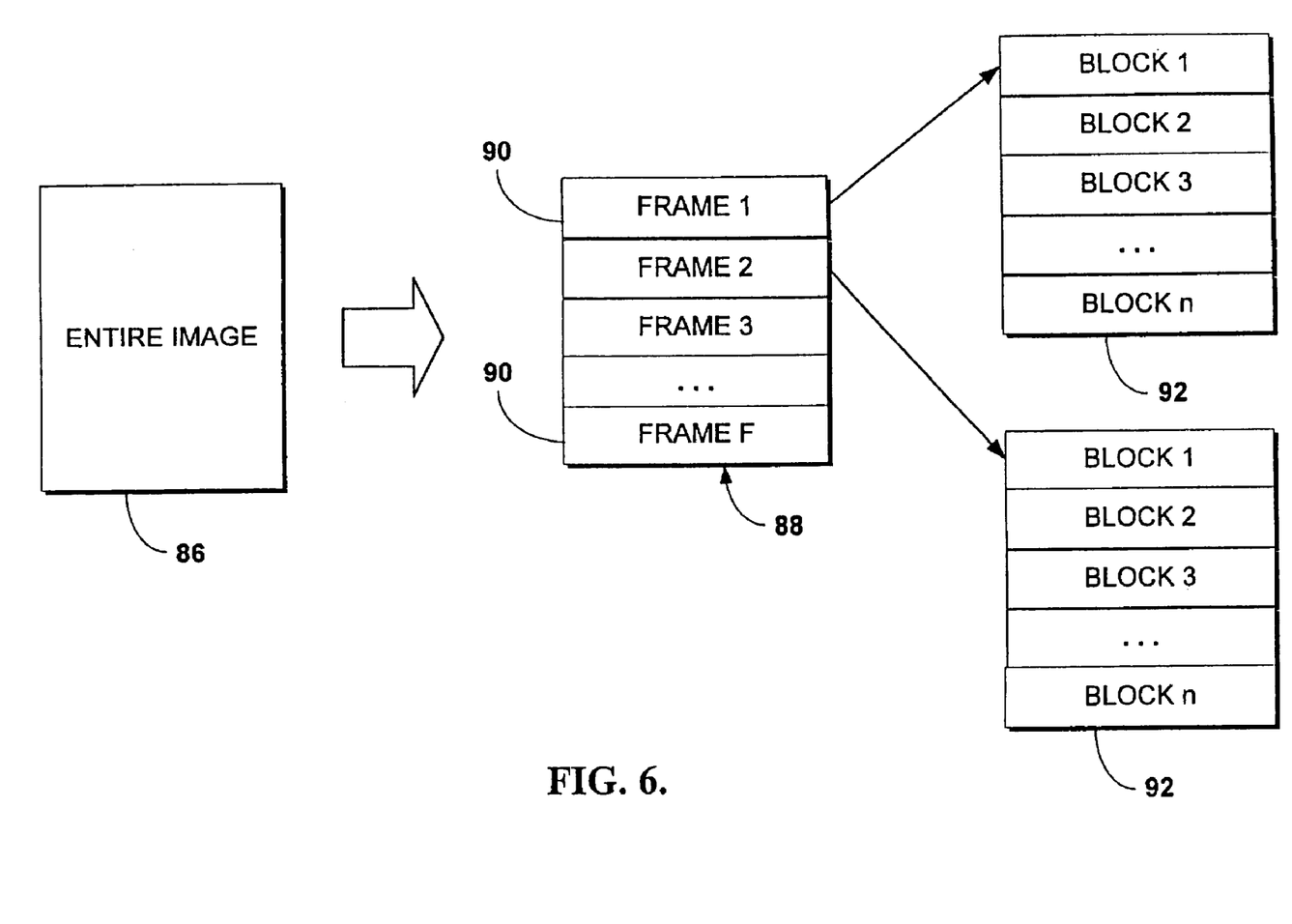
FIG. 6 is a block diagram illustrative of a software image parsing embodiment in accordance with the present invention.

With reference to FIG. 5, the present invention also implements an error transfer method for the downloading of an image from the site controller to the gaming machine. Upon receiving and storing the downloaded image in memory, the site controller (or PC) begins the download to the gaming machine at S74. Preferably as illustrated in FIG. 6, the software image 86 is organized into one or more frames 88 which are further organized into one ore more blocks 92 per frame. Each of the blocks 92 can then be transferred as individual communication packets. During the download process, site controller transfers all packets that make up the frame with reference again to FIG. 5, at the end of the transfer frame the site controller requests an acknowledgment from the gaming machine at S70.

If the gaming machine did not receive some portion of the frame, the transfer is incomplete at S82. The site controller preferably resends only those packets which are incomplete. Alternatively, the entire image may be resent or the transfer may be declared a failure. Accordingly, the gaming machine does not need to acknowledge receipt of each packet. As would be understood, however, alternative methods of grouping and sending the software image would be considered within the scope of the present invention.

Upon the transfer of the entire image to the gaming machine at S78, the central system requests an image signature to verify the transfer was successful at S80. If the signature is a match, the transfer is successful at S84. If the image is not a match, the image is incomplete at S82.

The above-described transfer protocols have been incorporated with reference to two separate encryption methods. As would be understood, a system implementing only a portion, different or no encryption methods would be considered within the scope of the present invention.

Once the image has been successfully transferred to the device, the image can be executed. Preferably, the central system sends a command to the device to begin using the new image in the executable space. This command typically includes separate instructions for configuring the system to accommodate the new image and preventing the future play of the current image while the switch is occurring. Upon the completion of the command, the device begins executing the new image and the switch is complete.

Because the device contains at least two separate executable spaces, the old image previously being executed remains in the device executable space after the switch is complete. In the event that the new image is corrupt or not functioning properly, the central system can execute a command to revert to the old image if it is still available and intact.

Although the devices specifically referenced in the present application refer solely to gaming machines or site controllers or PCs, the present invention allows images to be transferred to any device that is configured to receive an image. Such devices could include peripheral devices such as printers and bill acceptors or other intermediate communications devices. As would be understood, the images associated with each device would vary with the type of device and its function in the system.

In the foregoing specification, the present invention has been described with reference to the specific exemplary embodiments thereof. It will be apparent to those skilled in the art that a person understanding this invention may conceive of changes or other embodiments or variations, which utilize the principals of this invention without departing from the broader scope of the invention.

What is claimed:

1. A method of downloading and implementing a software image in a gaming machine network for player wagering, the method comprising:
   executing a first software image in a gaming machine to provide a first game of chance wherein the first software image is stored and executed from a first memory location on gaming machine;
   transmitting a second software image to provide a second game of chance from a central system to the gaming machine;
   receiving the second software image at the gaming machine while the first software image is executing;
   storing the second software image to a second memory location on the gaming machine;
   transmitting an image signature of the second software image stored in the second memory location from the gaming machine to the central system after the second software image is received at the gaming machine;
   comparing the image signature of the second software image from the gaming machine with an image signature at the central system;
   transmitting a command from the central system to the gaming machine to begin using the second software image at the gaming machine if the image signature of the second software image from the gaming machine matches the image signature at the central system;
   receiving a command from the central system to begin using the second software image at the gaming machine;
   terminating execution of the first software image at the gaming machine; and
   executing the second software image from one of the second memory location or a third memory location to provide the second game of chance at the gaming machine after the command is received and the execution of the first software image is terminated.

2. The method of claim 1, comprising;
   storing the second software image at the gaming machine while the fist software image is executing.

3. The method of claim 1, comprising:
   transmitting a portion of a second software image from the central system to the gaming machine while the first software image is executing;

transmitting an acknowledgement from the gaming machine to the central system the portion of the second software image has been received;
repeating the transmission of a portion of the second software image and the transmission of an acknowledgement until the entire second software image has been transmitted to the gaming machine.

4. The method of claim 1, comprising:
transmitting a random key from the central system to the gaming machine;
transmitting an encrypted second software image from the central system to the gaming machine;
receiving the random key at the gaming machine;
receiving the encrypted second software image at the gaming machine while the first software image is executing;
decrypting the encrypted second software image at the gaming machine using the random key.

5. The method of claim 1, comprising:
transmitting an encrypted random key from the central system to the gaming machine;
decrypting the encrypted random key using a key known to the gaming machine;
transmitting an encrypted second software image from the central system to the gaming machine;
receiving the encrypted second software image at the gaming machine while the first software image is executing; and
decrypting the encrypted second software image at the gaming machine using the random key.

6. The method of claim 1, comprising:
transmitting a request from the central system to a site controller to transmit an image signature of the second software image;
transmitting the image signature of the second software image from the site controller to the central system in response to the request; and
comparing the image signature of the second software image from the site controller with an image signature at the central system.

7. The method according to claim 1, comprising:
determining that the second software image is one of corrupt and not functioning properly;
executing the first software image if the second software image is determined to be one of corrupt and not functioning properly.

8. The method according to claim 7, comprising:
transmitting a command from the central system to the gaming machine to execute the first software system if the second software image is determined to be one of corrupt and not functioning properly.

9. The method of claim 1, comprising:
transmitting the second software image from the central system to a site controller,
receiving the second software image at the site controller; and
transmitting the second software image from the site controller to the gaming machine.

10. The method of claim 9, comprising:
transmitting a portion of a second software image from the central system to the site controller;
transmitting an acknowledgement from the site controller to the central system that the portion of the second software image has been received;
repeating the transmission of a portion of the second software image and the transmission of an acknowledgement until the entire software image has been transmitted to the site controller.

11. The method of claim 10, comprising:
transmitting an image signature of the second software image from the site controller to the central system;
comparing the image signature of the second software image from the site controller with an image signature at the central system;
transmitting a command from the central system to the site controller to transmit the second software image from the site controller to the gaming machine if the image signature of the second software image from the site controller matches the image signature at the central system.

12. The method of claim 11, comprising:
transmitting a portion of a second software image from the site controller to the gaming machine;
transmitting an acknowledgement from the gaming machine to the site controller that the portion of the second software image has been received;
repeating the transmission of a portion of the second software image and the transmission of an acknowledgement until the entire second software image has been transmitted to the gaming machine.

13. The method of claim 12, comprising:
transmitting the image signature of the second software image from the gaming machine to the central system in response to a request from the central system; and
comparing the image signature of the second software image from the gaming machine with an image signature at the central system.

14. The method of claim 9, comprising;
encrypting a second software image at the central system;
transmitting a random key from the central system to the site controller;
transmitting the encrypted second software image from the central system to the site controller;
decrypting the encrypted second software image at the site controller using the random key.

15. The method of claim 14, comprising;
transmitting a random key from the site controller to the gaming machine;
transmitting the encrypted second software image from the site controller to the gaming machine;
decrypting the encrypted second software image at the gaming machine using the random key.

16. The method of claim 1, further comprising: downloading the second software image to the central system.

17. The method of claim 1, further comprising: at the central system, selecting one or more devices to receive the second software image.

18. The method of claim 1, wherein the one or more devices are gaming machines, site controllers or combinations thereof.

19. The method of claim 1, wherein the second software image is transferred to the gaming machine from the central system via an intermediary device.

20. The method of claim 1, wherein the intermediary device is a site controller or a personal computer (PC).

21. The method of claim 1, wherein the first memory location is a first executable space and wherein the second memory location is a second executable space separate from the first executable space.

22. The method of claim 1, wherein the first memory location is a first portion of a single executable space and the second memory location is a second portion of the single executable space.

23. The method of claim 1, wherein the first memory location is a first executable space and the second memory location is a temporary storage location and wherein the second software image is transferred from the second memory location to the third memory location for execution.

24. The method of claim 1, wherein the first memory location, the second memory location, the third memory location or combinations thereof are memory locations in one or more non-volatile memory storage devices.

25. The method of claim 24, wherein one or more non-volatile memory storage devices are selected from the group consisting of a FLASH ROM, a DVD, a CD and a battery-backed RAM.

26. The method of claim 1, further comprising: preventing future play of the first software image.

27. A method of downloading and implementing a software image in a gaming machine for providing player wagering, the method comprising:

executing a first software image in a gaming machine to provide a first game of chance wherein the first software image is stored and executed in a first memory location on the gaming machine;

establishing communications with a remote device via a communication interface on the gaming machine;

receiving a second software image at the gaming machine from the remote device while the first software image is executing;

storing the second software image to a second memory location on the gaming machine;

after the second software image is received at the gaming machine, generating an image signature of the second software image stored in the second memory location;

transmitting the image signature of the second software image stored in the second memory location from the gaming machine to the remote device;

receiving a command from the remote device to begin using the second software image at the gaming machine;

terminating execution of the first software image at the gaming machine; and executing the second software image from the second memory location or a third memory location to provide the second game of chance at the gaming machine after the command is received and the execution of the first software image is terminated.

28. The method of claim 27, wherein the remote device is a central system or a site controller.

29. The method of claim 27, wherein the first memory location is a first executable space and wherein the second memory location is a second executable space separate from the first executable space.

30. The method of claim 27, wherein the first memory location is a first portion of a single executable space and the second memory location is a second portion of the single executable space.

31. The method of claim 27, wherein the first memory location is a first executable space and the second memory location is a temporary storage location and wherein the second software image is transferred by the gaming machine from the second memory location to the third memory location for execution.

32. The meted of claim 27, wherein the first memory location, the second memory location, the third memory locations or combinations thereof are memory locations in one or more non-volatile memory storage devices.

33. The method of claim 32, wherein one or more non-volatile memory storage devices are selected from the group consisting of a FLASH ROM, a DVD, a CD and a battery-backed RAM.

34. The method of claim 27, further comprising preventing future play of the first software image.

* * * * *